US009330076B2

(12) United States Patent
Daly et al.

(10) Patent No.: US 9,330,076 B2
(45) Date of Patent: May 3, 2016

(54) VIRTUAL STORAGE SYSTEM AND FILE CONVERSION METHOD

(71) Applicant: DigitalMailer, inc., Herndon, VA (US)

(72) Inventors: Ron M. Daly, Centreville, VA (US); Leonard Giambalvo, Fort Mill, SC (US)

(73) Assignee: Virtual StrongBox, Cornelius, NC (US)

( * ) Notice: Subject to any disclaimer, the term of this patent is extended or adjusted under 35 U.S.C. 154(b) by 207 days.

(21) Appl. No.: 13/914,697

(22) Filed: Jun. 11, 2013

(65) Prior Publication Data

US 2014/0215313 A1 Jul. 31, 2014

Related U.S. Application Data

(63) Continuation-in-part of application No. 13/751,982, filed on Jan. 28, 2013.

(51) Int. Cl.
*G06F 17/22* (2006.01)
*G06F 17/21* (2006.01)

(52) U.S. Cl.
CPC .......... *G06F 17/2264* (2013.01); *G06F 17/211* (2013.01); *G06F 17/212* (2013.01); *G06F 17/22* (2013.01)

(58) Field of Classification Search
CPC ................... G06F 17/30864; G06F 17/30011; G06F 174/30997; G06F 17/2247; G06F 17/30; G06F 17/30017; G06F 17/30696; G06F 17/3089; G06F 17/30905; G06F 17/30241; G06F 17/30873; G06F 21/31; G06F 3/1204; G06F 3/1286; G06F 9/543; G06F 17/2264; G06F 17/211; G06F 17/218; G06F 17/30911; G06F 17/212; G06F 17/22; G06F 21/602; G06F 2221/2107; G06F 17/30923; G06F 3/1246; G06F 3/1287; G06F 17/30076

See application file for complete search history.

(56) References Cited

U.S. PATENT DOCUMENTS

| | | | |
|---|---|---|---|
| 7,376,654 B1 * | 5/2008 | Chau et al. | |
| 2005/0117886 A1 * | 6/2005 | Kang et al. | ...................... 386/95 |
| 2006/0112011 A1 * | 5/2006 | Al-Ali | .................... G06Q 20/04 705/42 |
| 2007/0203917 A1 * | 8/2007 | Du | ........................ H04L 12/582 |
| 2010/0031140 A1 * | 2/2010 | Cummins | ............... G06F 21/64 715/236 |
| 2010/0042868 A1 * | 2/2010 | Apelbaum | .......... G06F 11/1482 714/2 |

* cited by examiner

*Primary Examiner* — Hashem Farrokh
(74) *Attorney, Agent, or Firm* — Brundidge & Stanger, P.C.

(57) ABSTRACT

A virtual storage system and file conversion method where at least one processor is configured to retrieve data of a first format corresponding to specific electronic data transmitted from an external system and stored within the virtual storage system, converting the data into a second format, retrieve a first style sheet to be associated with the data, convert the data using the first style sheet, retrieve a second style sheet for the data, and display the data at the user computing device using the second style sheet. The virtual storage system includes a plurality of redundant physical storage devices in data communication with the at least one processor and each configured to store the data retrieved from the external system, the first style sheet and the second style sheet, and the data to be displayed at the user computing device.

18 Claims, 11 Drawing Sheets

```
BEGINNING BALANCE:    237.43   ENDING BALANCE:              422.67
    DEPOSITS:         3605.78  TOTAL NUMBER DRAFTS CLEARED:   20
    DRAFTS:            817.86  YOUR AVG DAILY BALANCE WAS:  356.72
 MISC DEBITS:         2602.68  YOUR LOW MONTH BALANCE WAS:   66.25
                      SERVICE CHARGES:     .00

120401SHARE DRAFT #  7447           32033690   -23.00  214.43
    120401SHARE DRAFT #  7451           04016540   -30.00  184.43
    120401SHARE DRAFT #  7481           29028565   -30.00  154.43
    120501SHARE DRAFT #  7453           25044765    -7.00  147.43
120601PAYROLL DEPOSIT PRESIDENTS CREDIT UNION       732.01  879.44
    120601PRESIDENTS CREDIT UNION                  -623.93  255.51
```

```xml
<statement-period>
  <period-start>05/06/11</period-start>
  <period-end>06/05/11</period-end>
</statement-period>
<statement-period>
  <period-start>05/06/11</period-start>
  <period-end>06/05/11</period-end>
</statement-period>
<previous-balance>4978.39</previous-balance>
<summary-of-account>
  <payments>700.00</payments>
  <purchases>290.22</purchases>
  <cash-advances>350.00</cash-advances>
  <balance-transfers>0.00</balance-transfers>
  <interest-charged>40.65</interest-charged>
  <fees-charged>7.00</fees-charged>
  <new-balance>4966.26</new-balance>
  <credit-limit>5000.00</credit-limit>
  <available-credit>33.74</available-credit>
  <amount-disputed>0.00</amount-disputed>
  <statement-closing-date>06/05/11</statement-closing-date>
  <days-in-billing-cycle>31</days-in-billing-cycle>
```

VIRTUAL STORAGE SYSTEM AND FILE CONVERSION METHOD

CROSS-REFERENCE TO RELATED APPLICATION

This is a continuation-in-part application of U.S. application Ser. No. 13/751,982, filed Jan. 28, 2013, the contents of which are incorporated herein by reference.

BACKGROUND OF THE INVENTION

1. Field of the Invention

The present invention relates to a virtual storage system. More particularly, the present invention relates to a virtual storage system and a file conversion method for converting a format of electronic data from an electronic document storage and retrieval system.

2. Description of the related art.

Electronic storage systems have become a popular alternative for storing electronic documents (e.g., files) thereby eliminating the need to install physical storage devices and minimizing file storage costs. An electronic document storage and retrieval system is an online system such as an online banking system, for retrieving the electronic documents (e.g., banking statements) stored within an electronic storage system. The electronic storage system stores data in virtual storage pools. The pools are hosted by third parties that operate large data centers. The third parties virtualize resources in servers and present the resources as virtual storage pools for users to store files, for example. The electronic document retrieval system is accessed through a web application programming interface (API), a gateway or a Web-based user interface (UI), for example.

An online banking system provides resources to enable users to conduct banking transactions electronically from a personal computer, for example. Online banking transactions include monitoring accounts, viewing and downloading banking statements, conducting money transfers, applying for loans, submitting loan payments, etc.

SUMMARY OF THE INVENTION

The present invention relates to virtual storage system and file conversion method for converting a format of an electronic document to create different presentations of the data within the electronic document to a user, for example, online via a website, via mobile device or via another type of communication device.

The present invention provides a virtual storage system in data communication with a user computing device via a communication network, the virtual storage system comprising at least one processor configured to retrieve data of a first format corresponding to specific electronic data transmitted from an external system and stored within the virtual storage system, convert the data into a second format, retrieve a first style sheet to be associated with the data, convert the data using the first style sheet, retrieve a second style sheet for the data, and display the data at the user computing device using the second style sheet. The virtual storage system further comprises a plurality of redundant physical storage devices in data communication with the at least one processor and each configured to store the data retrieved from the external system, the first style sheet and the second style sheet, and the data to be displayed at the user computing device.

Further, the present invention is a method implemented by computer system to effect the file conversion of data within a virtual storage system, the method comprising connecting the virtual storage system with an external system, retrieving, via the virtual storage system, data of a first format corresponding to specific electronic data transmitted from the external system and stored within the virtual storage system, converting the data into a second format, retrieving a first style sheet associated with the data, converting the data using the first style sheet, retreiving a second style sheet for the data, and displaying the data using the second style sheet.

Further, the present invention is a method implemented by computer system to effect copying of electronic documents into a virtual storage system in data communication via a communication network, with an external system, the method comprising processing an electronic document associated with a user, at the external system, determining whether the user has access rights to the virtual storage system, converting the electronic document from a first format into a second format, and copying the electronic document to the virtual storage system.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

FIGS. 7A-B are examples of structured data and unstructured data, respectively, according to one or more embodiments of the present invention.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Specific details are given in the following description to provide a thorough understanding of the embodiments. However, it will be understood by one of ordinary skill in the art that the embodiments may be practiced without these specific details. For example, systems, networks, processes, and other components may be shown as components in block diagram form in order not to obscure the embodiments in unnecessary detail. Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The present invention as will be described in greater detail below provides a file conversion method for converting electronic documents, (e.g., electronic banking statements) into a desired format, and a virtual storage system implementing the file conversion method therein and interfacing with an electronic document storage and retrieval system. The present invention provides various embodiments as described below. However it should be noted that the present invention is not limited to the embodiments described herein, but could extend to other embodiments as would be known or as would become known to those skilled in the art.

Figure 1:
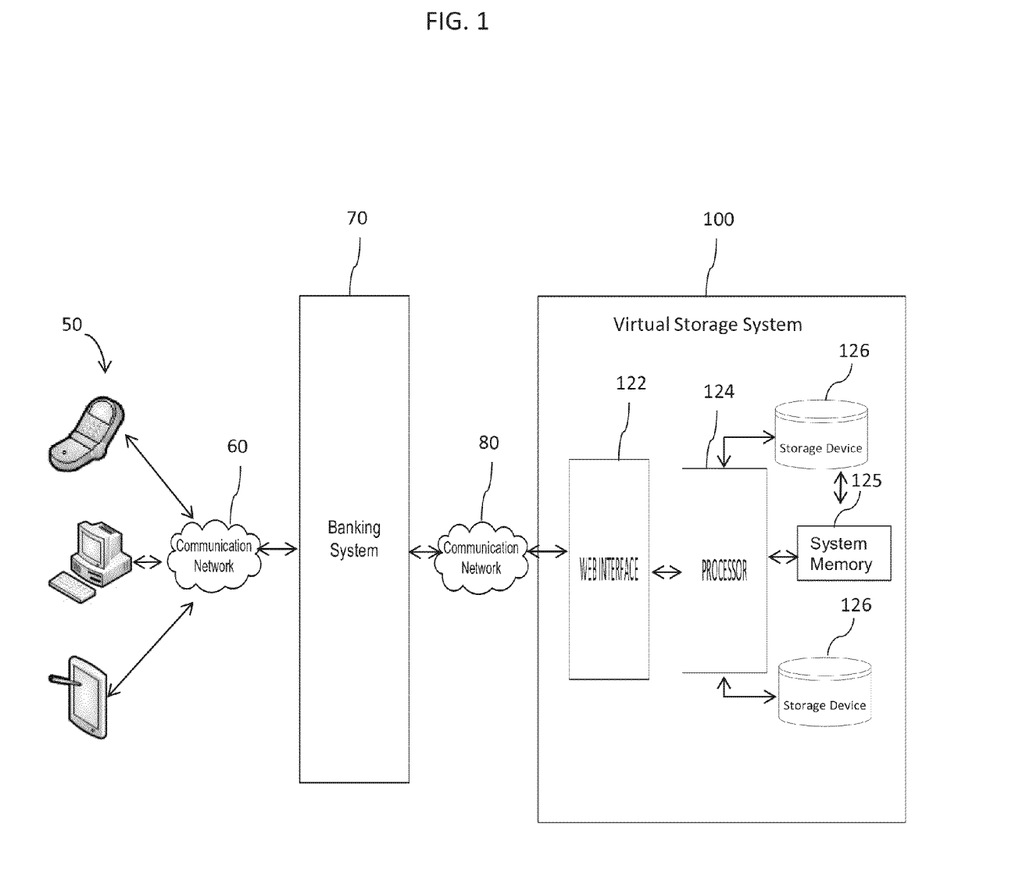
FIG. 1 is a block diagram of an electronic document storage and retrieval system interfacing with a virtual storage system that can be implemented within one or more embodiments of the present invention.

FIG. 1 is a block diagram of an electronic documents retrieval system implemented within one or more embodiments of the present invention. In FIG. 1, a user at a user computing device 50 is configured to access, via a communication network 60, an external system i.e., an online document storage and retrieval system such as a banking system 70 to perform online banking transactions, such as viewing bank accounts and bank statements, applying for loans, and other transactions. According to one or more embodiments, the user computing device 50 includes at least one of a mobile phone or smart phone, a personal computer or laptop, or a personal digital assistant (PDA) or tablet. The present invention is not limited to any particular type of user computing device 50, and may vary accordingly. Although the disclosure is described using a banking system as depicted in FIGS. 1-4 as an example online document storage and retrieval system, the embodiments of the present invention are not limited to a banking system and may be implemented within any other suitable system, as desired.

According to one or more embodiments, the user accesses the banking system 70 by inputting input data including identification and log-in information such as a user ID and password via a user interface (UI) of the user computing device 50. Once the identification/log-in information is received at a banking application of the banking system 70, the banking system 70 retrieves the user's banking information and displays the banking information via a display of the user computing device 50. The banking system 70 is configured to receive the input data and provide the user with electronic data (e.g., banking information) over the communication network 60. The banking information which is retrievable (e.g., banking statements) may be in a certain format (e.g., a portable document format (pdf)). The banking system 70 communicates via a communication network 80, with a virtual storage system 100 described in detail below.

The communication networks 60 and 80 include a wired or wireless network for data communication. The data communication across the communication networks 60 and 80 is achieved by using web services technology including for example, Web services Description Language (WSDL). The communication networks 60 and 80 may include any subsystem for exchanging data such as the Internet, intranet, extranet, wide area network (WAN), local area network (LAN), Restful web services, JAVAScript Object Notation (JSON), Extensible Mark-up Language (XML)-based communication network, Simple Object Access Protocol (SOAP)-based Services and satellite communication network. Further, the communication networks 60 and 80 can be other types of networks such as interactive television (ITV). According to one or more embodiments, the communication networks 60 and 80 may be the same or different types of networks.

The virtual storage system 100 is a user-specific storage system which interfaces with the banking system 70. The virtual storage system 100 allows each user to have a secure access to the user's specific banking information (e.g., banking statements) and any of the user's files stored within the virtual storage system 100. The virtual storage system 100 securely receives banking information from the banking system 70, processes the banking information received and securely stores and displays the banking information to the user when requested. For example, according to one or more embodiments, the virtual storage system 100 receives electronic data (e.g., account data) and processes the electronic data and generates an electronic document (e.g., a banking statement, loan statement or other applicable statement) corresponding to the electronic data, viewable by the user upon request, as described in the file conversion method of FIG. 6, for example.

According to one or more embodiments, the virtual storage system 100 also retrieves and copies existing electronic documents (e.g., existing banking statements, etc.) from the banking system 70 or from other external systems, and stores the existing electronic documents therein when desired by the user.

In addition, the virtual storage system 100 encrypts each electronic document as it is retrieved from the banking system 70, and only the user-owner can access the electronic document thereby leaving ownership of the files within the virtual storage system 100 with the user-owner at all times.

According to one or more embodiments, the virtual storage system 100 includes a web interface 122 for interfacing with the external system (i.e., the banking system 70) over the communication network 80. The web interface 122 provides a secure connection to the virtual storage system 100. According to one or more embodiments, the web interface 122 is a specifically-designed application programming interface (API), for example, which performs authentication of the user or the external system (e.g., the banking system 70) at multiple levels. A secure connection is made between the banking system 70 and the virtual storage system 100 on a transport layer level, for example. According to one or more embodiments, a transport layer security (TLS) or secure sockets layer (SSL) cryptographic protocol may be employed to provide secure communication over the communication networks 60 and 80. According to one or more embodiments, the web interface 122 is a web application programming interface (API), a gateway or a Web-based user interface (UI), for example.

According to one or more embodiments, the virtual storage system 100 is PCI Compliant to allow storage of cardholder information for the major debit, credit, prepaid, e-purse, ATM, and POS cards. The virtual storage system 100 further includes at least one processor 124 for receiving information including requests from the user at the banking system 70 and processing the requests, such as storing, retrieving and copying electronic documents. The virtual storage system 100 further includes a system memory 125 and at least one storage server comprising a plurality of physical storage devices 126 for storing files such as electronic documents, audio files, photographs, movies, and images received from the user via the banking system 70. The system memory 125 may retrieve the electronic data and any instructions/rules from the storage devices 126 and loads the electronic data and instructions/rules into the processor 124 for processing. The virtual storage system 100 further acts as a safe deposit box for receiving and securely storing the files received from the user via the banking system 70. Although only one processor 124 and two storage devices 126 are shown, the present invention is not limited hereto, and may vary accordingly.

As shown in FIG. 1, the virtual storage system 100 includes a web interface (e.g., the web interface 122) however the present invention is not limited to this particular configuration, and may vary accordingly.

Figure 2:
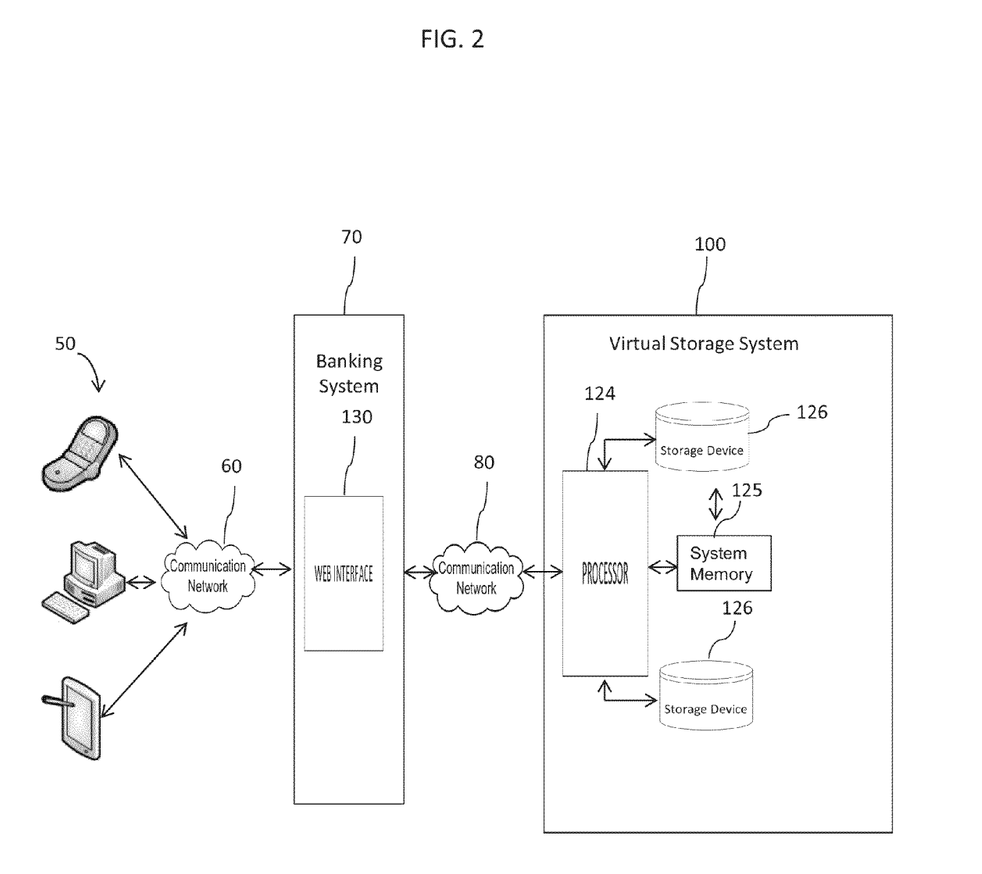
FIG. 2 is a block diagram of an electronic document storage and retrieval system interfacing with a virtual storage system that can be implemented within alternative embodiments of the present invention.
Figure 3:
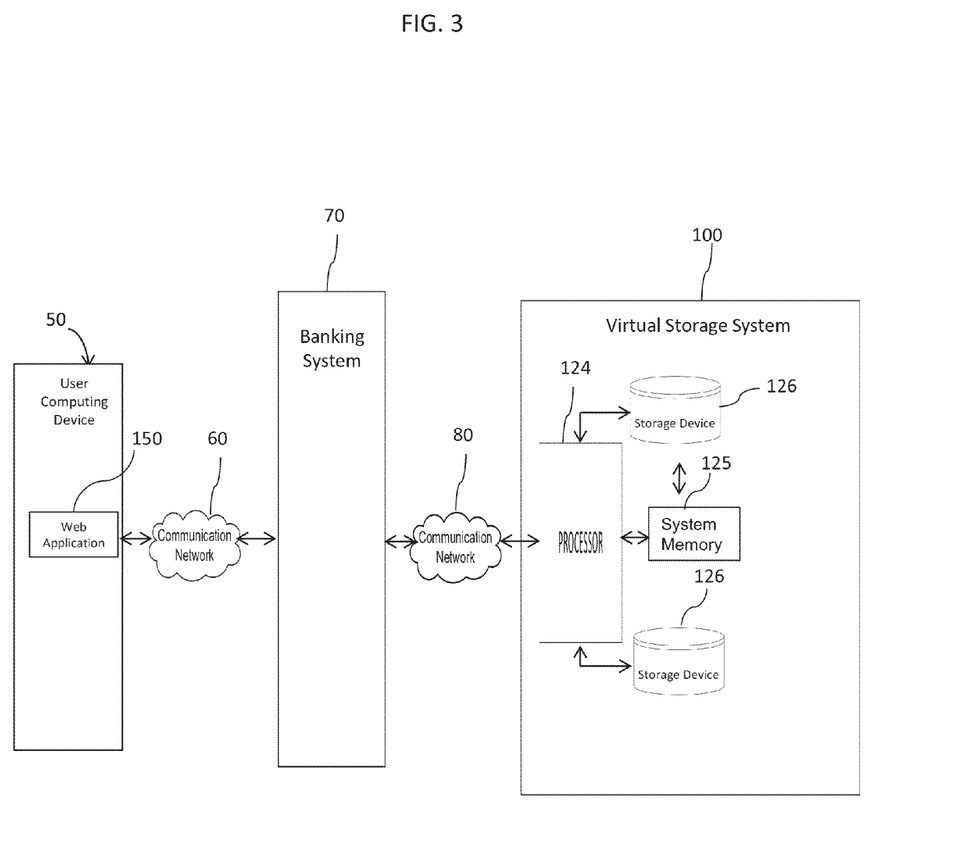
FIG. 3 is a block diagram of an electronic document storage and retrieval system interfacing with a virtual storage system that can be implemented within alternative embodiments of the present invention.
Figure 4:
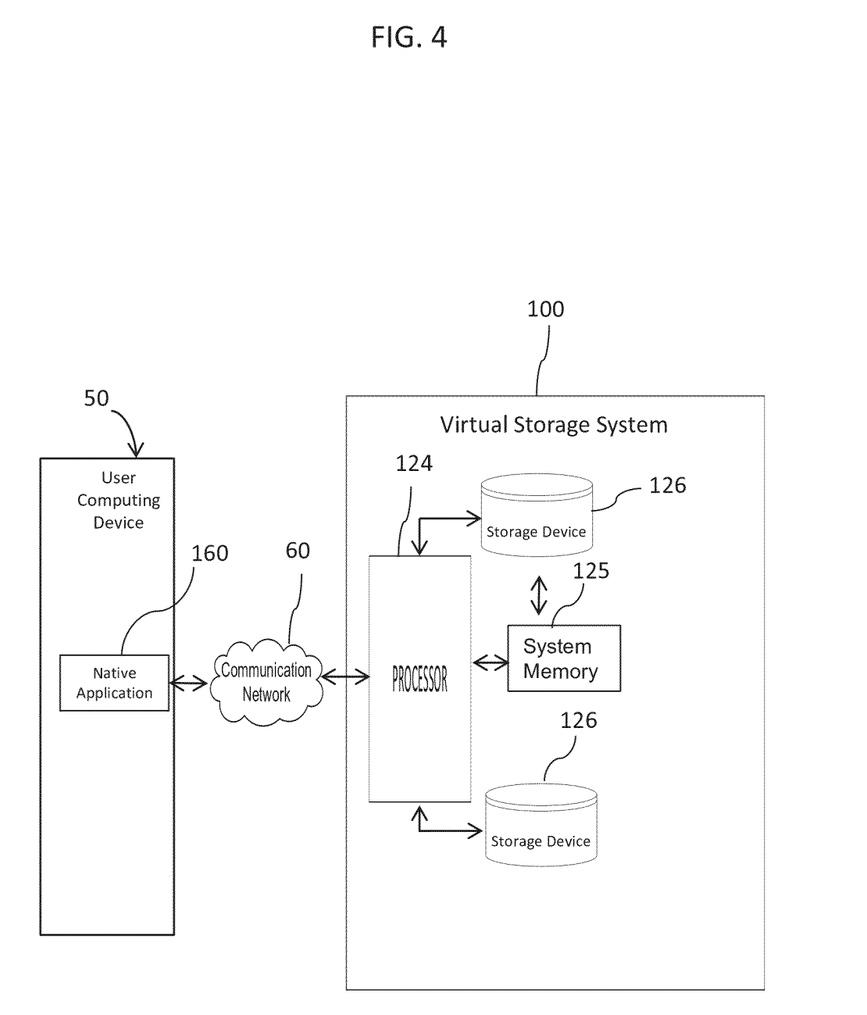
FIG. 4 is a block diagram of an electronic document storage and retrieval system interfacing with a virtual storage system that can be implemented within alternative embodiments of the present invention.

FIGS. 2 through 4 illustrate alternative configurations of the virtual storage system 100, and communication between the virtual storage system 100, the external system (e.g., the banking system 70), and/or the user computing device 50 according to other embodiments of the present invention that may be implemented. Some of the components shown in FIGS. 2 through 4 are the same as the components discussed above with reference to FIG. 1 therefore a detailed description of these components is omitted.

As shown in FIG. 2, in an alternative embodiment, the banking system 70 includes a web interface 130 configured to interface the banking system 70 with the virtual storage system 100 over the communication network 80. The web interface 130 functions in a similar manner as the web interface 122 of the virtual storage system 100 therefore in this embodiment, the web interface 122 of the virtual storage system 100 is omitted.

As shown in FIG. 3, in another alternative embodiment, the user computing device 50 includes a web application 150 (e.g., a web API) for connecting to the banking system 70 and the virtual storage system 100 indirectly through the banking system 70. The web application 150 is an internet-enabled application, for example, that has specific functionality for the user computing device 50 (e.g., a mobile phone). The web application 150 is accessed through a web browser of the user computing device 50 and does not require downloading and installing thereof onto the user computing device 50.

As shown in FIG. 4, in yet another alternative embodiment, the user computing device 50 includes a native application 160 for connecting directly to web services (i.e., the processor 124) of the virtual storage system 100. The native application 160 is directly installed on the user computing device 50 to allow the user to gain direct access to the virtual storage system 100. The native application 160 is a specifically-designed API for accessing the virtual storage system 100. For example, if the user computing device 50 is a tablet, the tablet may include a tablet API for directly accessing the web services of the virtual storage system 100. Therefore, in this embodiment, the web interface 130 of the banking system 70 as shown in the embodiment illustrated in FIG. 2; and the web interface 122 of the virtual storage system 100 as shown in FIG. 3 are omitted.

According to one or more embodiments, the native application 160 may include a multi-factor authentication process to be performed at many levels to enable a user to gain direct access to the virtual storage system 100 from the user computing device 50. The multi-factor authentication process may include steps such as sending login information (e.g., user ID and password information) in a correspondence (e.g., a text message or email) to the user, and providing a time-based one-time password system to the user via a third party.

According to another embodiment, a single-factor authentication process may be used to gain access to the virtual storage system 100 via the external system (e.g., the banking system 70) since the external system and the virtual storage system 100 communicate via a secure connection on the communication network 80.

Figure 11:
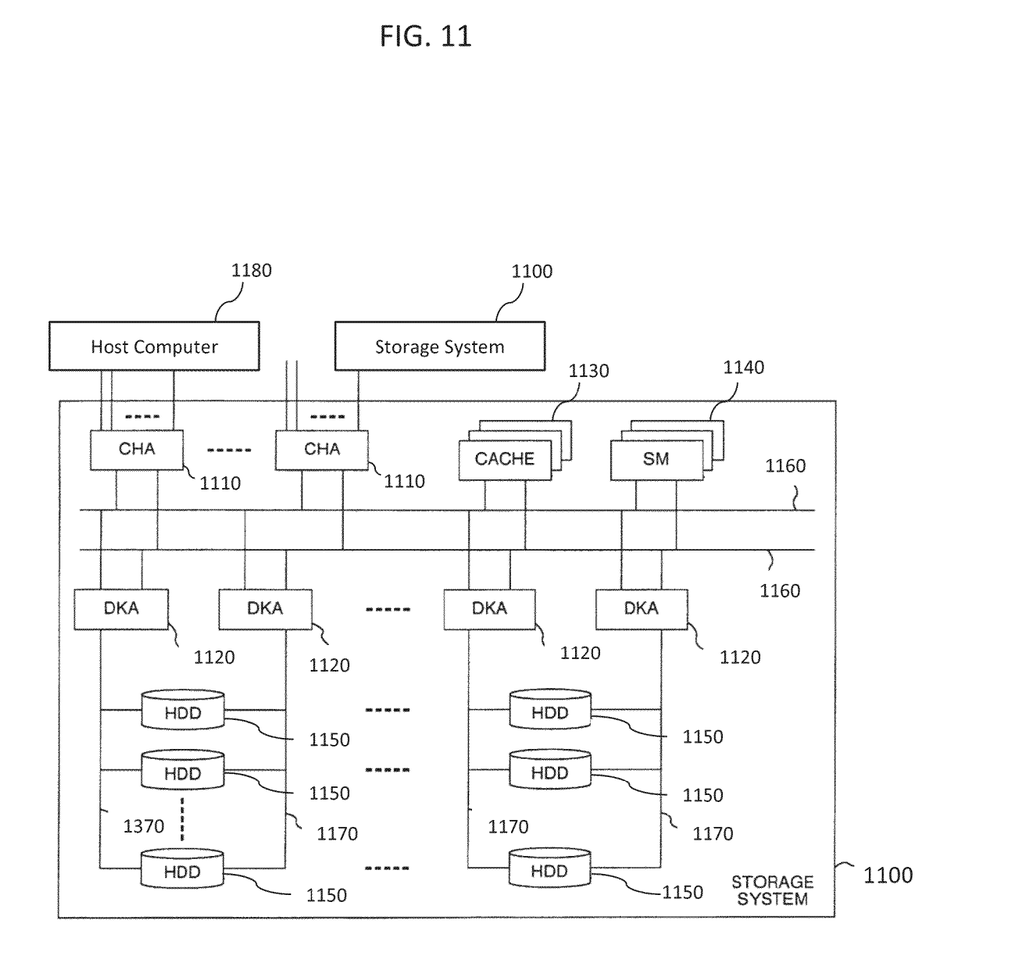
FIG. 11 is a block diagram of an exemplary physical storage system for implementation of the virtual storage system in accordance with one or more embodiments of the present invention.

It should be noted that the virtual storage system is implemented on a physical storage system 1100 such as that illustrated in FIG. 11.

As shown in FIG. 11, the physical storage system 1100 includes a plurality of host adapters (CHA) 1110, disk adapters (DKA) 1120, cache memories (CACHE) 1130, shared memories (SM) 1140, and hard disk drives (HDD) 1150 connected with each other via common paths 1160 and connection lines 1170. Each of the hard disk drives (HDD) 1150 is connected to two disk adapters 1120, for example, using different connection lines 1170. The host adapters 1110 control data transfer between host computers 1180, the cache memories 1130 and the hard disk drives 1150. The cache memories 1130 temporarily store data received from the host computer 1180 and data read from the hard disk drives 1150. The shared memories 1140 are shared between the host adapters 1110 and the disk adapters 1120. The present invention is not limited to any particular number of host adapters 1110, disk adapters 1120, cache memories 1130, shared memories 1140 and hard disk drives 1150, and may vary accordingly. The physical storage system 1100 is one example of a physical storage system for which the virtual storage system can be implemented thereon. The present invention is not limited to a particular configuration of the physical storage system. According to other embodiments, the hard disk drives (HDD) 1150 can be replaced with a flash storage, RAM disks or rotated disk drives, for example. The host computers 1380 can be the processor 124 or a separate computer, for example. Further, the virtual storage system 100 can be implemented on any type of storage system such as a network-attached storage (NAS), a storage area network (SAN), or a distributed memory array.

According to one or more embodiments, the physical storage devices of the physical storage system 1100 as described above can be configured in a RAID (Redundant Array of Independent Disks) configuration. Further, the reliability of the data stored in the storage devices 126 of the virtual storage system 100 can be stored in a redundant manner in redundant data centers using mirroring, remote copy, or the like. The use of redundant storage devices enables the data stored to be duplicated thereby preventing data loss.

When a user accesses the banking system 70 via a bank server, the user can be automatically directed to the virtual storage system 100 when desired.

As shown in FIGS. 1 through 4, the user computing device 50, banking system 70 and virtual storage system 100 can be connected with each other via the communication networks 60 and 80. According to one embodiment, the user computing device 50 may occasionally connect to the communication network 60 while the banking system 70 and the virtual storage system 100 may maintain a connection to the communication networks 60 and 80. Further, in FIG. 4 the user computing device 50 and the virtual storage system 100 are in direct communication with each other over the communication network 80.

According to alternative embodiments, the virtual storage system 100 can be included within the banking system 70 or the user computing device 50 as installable software.

Figure 5:
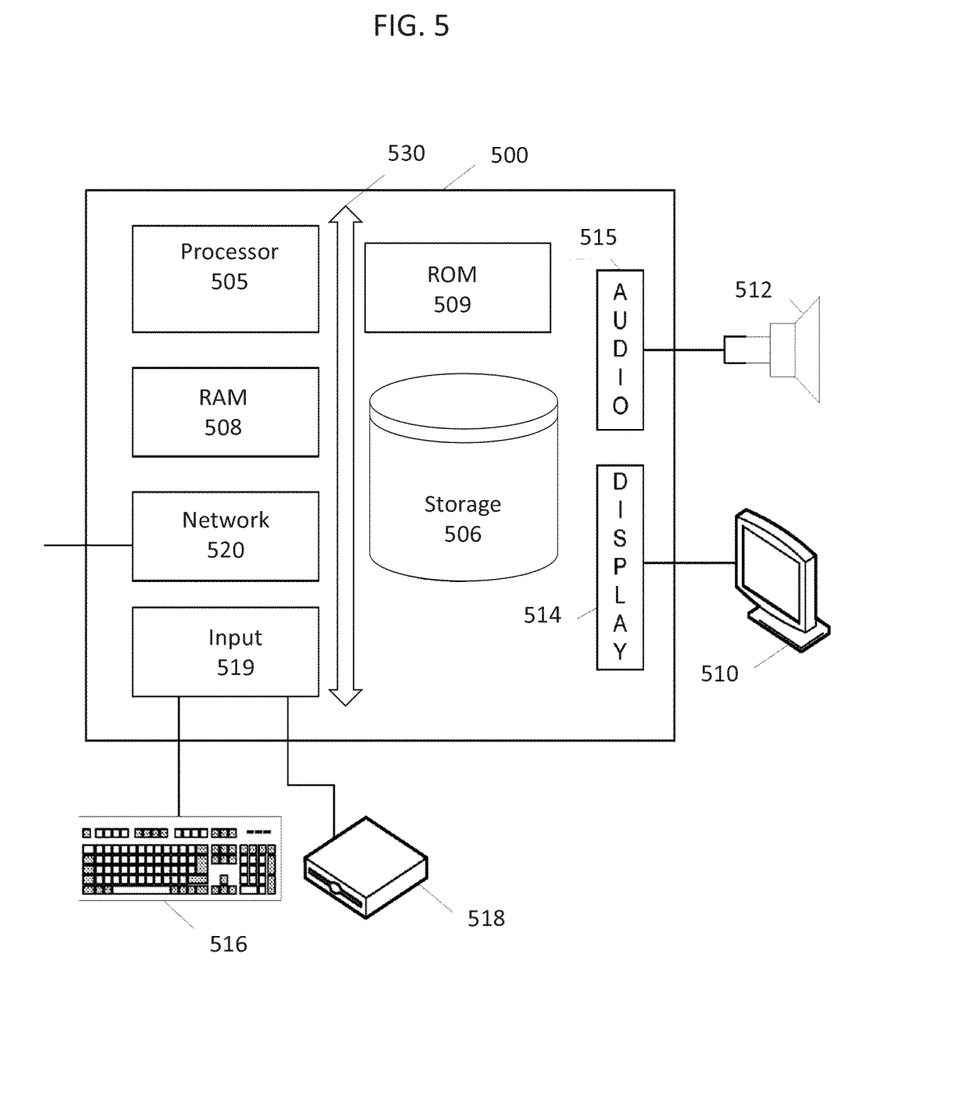
FIG. 5 is a block diagram of an exemplary computer to be implemented within one or more embodiments of the present invention.

FIG. 5 is a block diagram of an exemplary computing device 500 illustrating components of the computing device 50, the banking system 70 and the virtual storage system 100 shown in FIG. 1. As shown in FIG. 5, the computing device 500 includes various components for inputting, outputting, storing and processing data. The computing device 500 includes a processor 505 for performing tasks including executing one or more applications, retrieving data from a storage device e.g., storage 506, and/or outputting data. The processor 505 can be connected to a Random access memory (RAM) module 508 wherein application data and/or instructions may be temporarily stored. The computing device 500 can further includes a Read Only Memory (ROM) 509 configured to allow data stored thereon to persist after the computing device 500 is turned off and is used for storing an operating system (OS) of the computing device 500. The storage device 506 may also provide storage for data files and may include computer readable mediums e.g., disk drives, optical storage mediums e.g., CD ROM drives, magnetic tape storage systems, and flash memory. The processor 505 is configured to retrieve an application from the storage 506 and store the instructions associated with the application in the RAM module 508, while the processor 505 is executing the application. The computing device 500 further includes output devices e.g., a display device 510, and a speaker 512, for outputting visual and audio data via a display adapter 514 and an audio adapter 515. Further, the computing device 500 includes input devices e.g., a keyboard 516, a storage media drive 518, and microphone each having an associated adapter 519 for converting the input data into computer readable data. The storage media drive 518 enables users to read and write data to and from the storage media.

Further, as shown in FIG. 5, the computing device 500 includes one or more components for receiving and transmitting data over the communication networks 60 and 80. For example, a network adapter 520 is provided for communication with one or more computing devices over an IP network, for example, for transmission of data such as financial data over a bank network. The network adapter 520 may include instructions associated with processing IP network packets and cellular network packets. The components of the computing device 500 are connected via a system bus 530.

Figure 6:
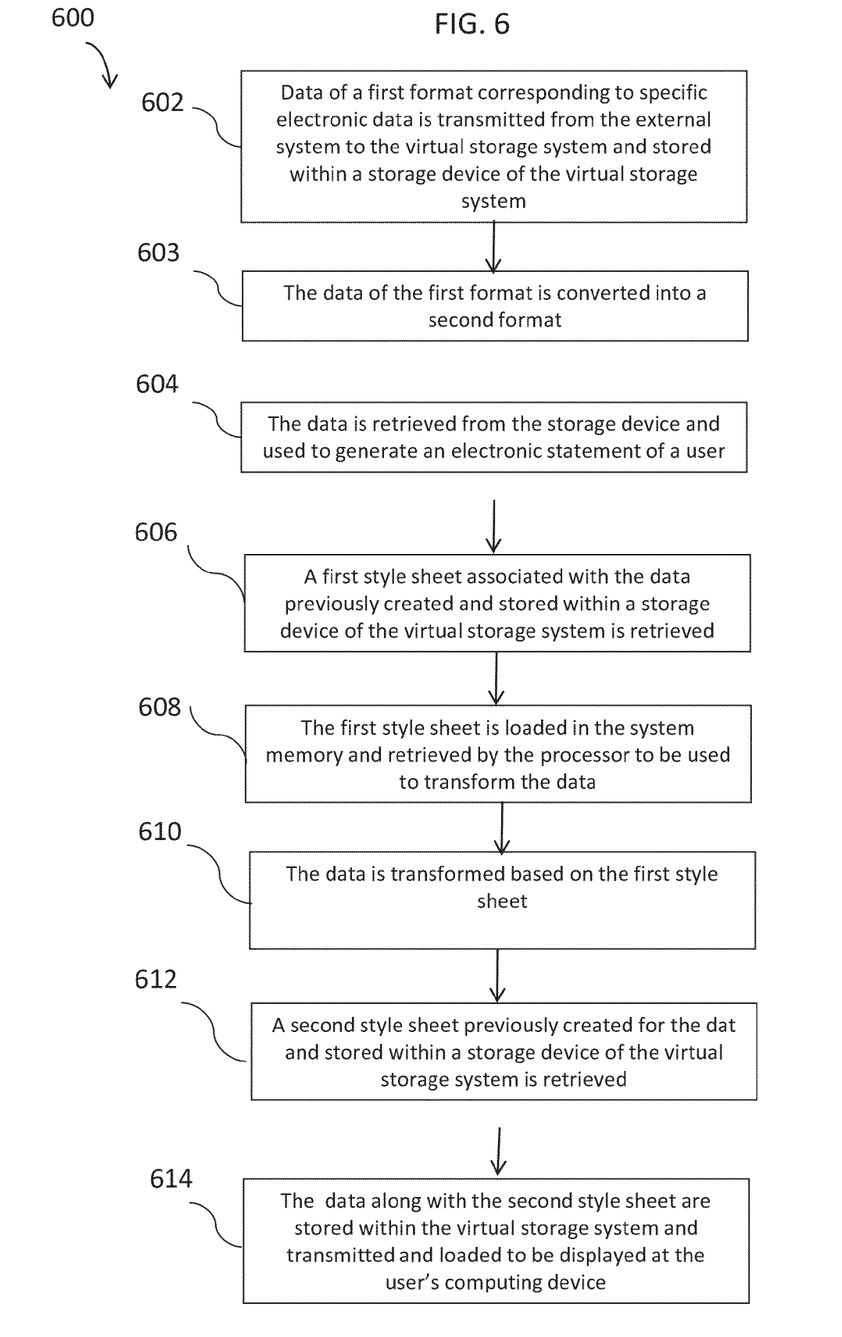
FIG. 6 is a flowchart illustrating a file conversion method performed within the virtual storage system according to one or more embodiments of the present invention.

FIG. 6 is a flowchart illustrating a file conversion method 600 for performing a method of converting unstructured data (e.g., user banking account data) from the online document storage and retrieval system (e.g., the banking system 70) into structured data (e.g., a banking statement) within the virtual storage system 100 of FIG. 1, for example, according to one or more embodiments of the present invention. The method 600 is implemented in software modules for execution by the user computing device 50, the banking system 70 and the virtual storage system 100.

In method 600, the virtual storage system 100 interfaces with the online document storage and retrieval system (e.g., the banking system 70 as depicted in FIG. 1, for example). At operation 602, the virtual storage system 100 establishes a connection with the banking system 70 and data of a first format corresponding to specific electronic data (e.g., user-specific banking account data) is transmitted from the banking system 70 to the virtual storage system 100 and stored in a database within a storage device 126 of the virtual storage system 100. It should be noted that the data could, for example, be unstructured data or structured data generated in the banking system 70 as a result of transactions conducted on behalf of a banking customer and transmitted by the banking system 70 to the virtual storage system 100 and stored within the storage device 126 of the virtual storage system 100. FIGS. 7A and 7B illustrate examples of unstructured data 700 and structured data 750, respectively. As shown in FIG. 7A, unstructured data may be a text flat format such as notepad format. As shown in FIG. 7B, the structured data 750 may be of an Extensible Markup language (XML) format, for example. The XML format is a markup language that defines a set of rules for encoding documents in a format that is readable by both a human and a computing device.

According to one or more embodiments, the data of the first format may be transmitted periodically (e.g., once per hour, once per day, weekly, or monthly in the case of monthly statements) or dynamically in real-time (i.e., as updates occur within the banking system 70).

Further, from operation 602 the process continues to operation 603 where the data is converted from a first format into a second format. According to one embodiment, the first format may be unstructured data and the second format may be structured data.

From operation 603, the process continues to operation 604, where the data of the second format is retrieved from the storage device 126 and used to generate, via the processor 124, an electronic statement of a user.

From operation 604, the process continues to operation 606 where a first style sheet associated with the data having been previously created and stored within a storage device 126 of the virtual storage system 100 is retrieved for transforming the data.

According to one or more embodiments, a style sheet is a computer language to express the presentation of the electronic data. For example, a style sheet may include computer language which expresses the amount of spacing between text lines, the colors used for the text and the backgrounds, and font size and style, for example. According to one or more embodiments, a style sheet may be stored in a storage device 126 as a separate file from data (e.g., unstructured or structured data), to thereby be reused as needed.

According to one or more embodiments, the first style sheet is of a predetermined format, for example, an Extensible Stylesheet Language (XSL) format for performing XSL transformations. According to one or more embodiments, the first style sheet is customized at the virtual storage system 100 to be bank-specific.

From operation 606, the process continues to operation 608 where the first style sheet is loaded into the system memory 125 and retrieved by the processor 124 to be used to transform the data. From operation 608, the process continues to operation 610 where the data is converted by the processor 124 based on the first style sheet. For example, according to one or more embodiments, the XML data is converted (i.e., transformed) to Hyper Text Markup Language (HTML) data based on the first style sheet.

At operation 612, a second style sheet previously created for the structured data and stored within a storage device 126 of the virtual storage system 100 is retrieved and is loaded on the system memory 125 and retrieved by the processor 124. According to one or more embodiments, the second style sheet is a cascading stylesheet (CSS). The second stylesheet is used for describing the presentation semantics (the style and formatting) of the electronic document (e.g., banking statement) written in HTML. The CSS allows style information from several sources to be blended together, for example corporate style guidelines, styles common to a group of documents, or styles specific to a single document. The second style sheet enables the separation of structured data (e.g., the HTML data) from the document presentation, including e.g., the layout, colors, and fonts. The present invention is not limited to any particular type of first and second stylesheets or number of stylesheets, and may vary as needed. For example, according to another embodiment, the second style sheet may be may be embedded into the first style sheet. From operation 612, the process continues to operation 614 where the data along with the second style sheet are transmitted to the user's computing device 50 and then loaded in the processor 505 of the user's computing device. The processor 505 of the user's computing device 50 processes the data along with the second style sheet such that the data is displayed on the display of the user's computing device according to the second style sheet.

According to one or more embodiments, the data retrieved from the banking system 70 may be encrypted prior to being stored within a storage location of the virtual storage system 100, the encryption operation may be performed in a different storage location of the virtual storage system 100 (e.g., a data center) than the storage location where the data is to be stored. The encryption operation may be performed in accordance with the process outlined in the co-pending application Ser. No. 13/752,023 entitled Virtual Storage System and File Encryption Methods filed on Jan. 28, 2013 by Ron M. Daly Jr. et al., which is incorporated by reference herein in its entirety.

According to alternative embodiment of the present invention, the data may be converted from unstructured data to a portable document format (pdf), unstructured data to html and then to pdf, from structured data to another form of structured data, or other suitable format to be viewed by the user at the user computing device 50.

According to one or more embodiments, the electronic document is accessible only by the user at the user computing device 50 via the banking system 70 according to one embodiment, or via the virtual storage system 100 directly, according to alternative embodiments. The data conversion operations are performed via the processor 124 of the virtual storage system 100.

According to one or more other embodiments, the file conversion method of the present invention may be implemented within the virtual storage system 100 when copying existing electronic documents into the virtual storage system 100 from an external source, for example, the user's computing device 50 or the banking system 70.

Figure 8:
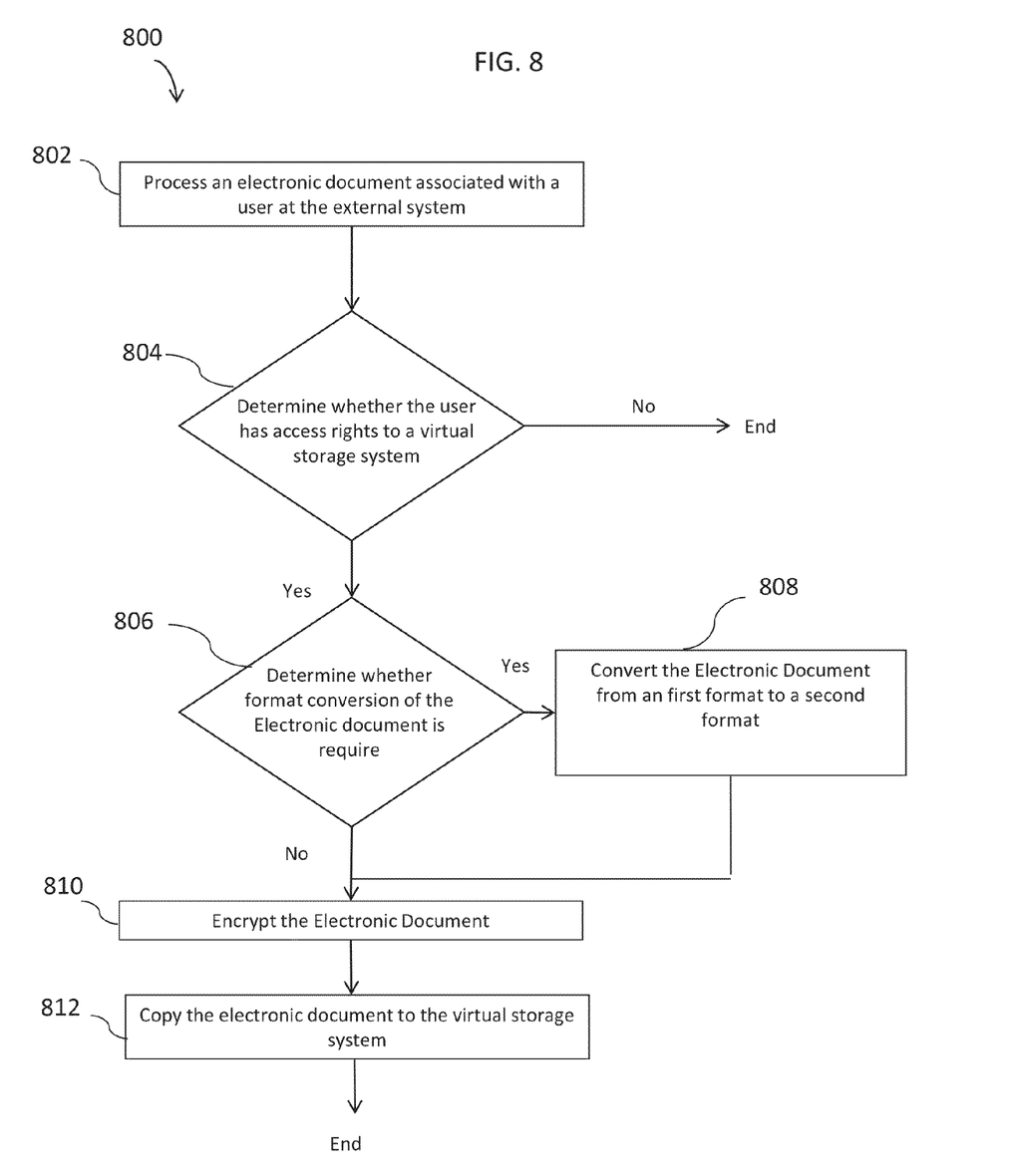
FIG. 8 is a flowchart illustrating a method of copying existing electronic documents into the virtual storage system after converting the existing electronic documents using the file conversion method of FIG. 6, according to one or more embodiments of the present invention.

According to embodiments of the present invention, the copying of existing electronic documents can be performed manually or automatically without user input. FIG. 8 is a flowchart illustrating a method 800 of copying electronic documents into the virtual storage system of FIG. 1 and performing file conversion method of FIG. 6 prior to copying the electronic document, according to one or more embodiments of the present invention. In this embodiment, electronic documents are copied from the external system (e.g., the banking system 70) into the virtual storage system 100 when the user has access rights to the virtual storage system 100. At operation 802, the process begins where an electronic document associated with a user is processed at the external system (e.g., the banking system 70). The processing is performed internally within the banking system 70. From operation 802, the process continues to operation 803, where it is determined whether the user has access rights to the virtual storage system 100. In one or more embodiments, if the user is accessing the virtual storage system 100 indirectly through the banking system 70, access rights of the user may have been established by virtue of the user's access rights to the banking system 70. Thus, a verification process may be performed by the virtual storage system 100 at the banking system 70, via the secure connection over the communication network 80. Alternatively, if the user is accessing the virtual storage system 100 directly via the user computing device, access rights of the user may be verified by performing a multi-factor authentication process as discussed above If it is determine that the user does not have access rights to the virtual storage system 100, the process ends.

If it is determined at operation 803 that the user has access rights, the process continues to operation 806, where it is determined whether file conversion is desired. If it is determined at operation 806 that format conversion is desired, the process continues to operation 808 where the file conversion method of FIG. 6 is performed, whereby the electronic document is converted from XML format to HTML format, for example. According to one or more embodiments, operation 808 is performed similar to operation 602 through 612 shown in FIG. 6.

Upon completion of the format conversion, the process continues to operation 810 where the data is encrypted within the virtual storage system 100.

From operation 810, the process continues to operation 812 where the electronic document is then copied to a selected folder of the plurality of electronic folders (i.e., the electronic documents are stored in the storage devices 126 of the virtual storage system 100).

According to one or more embodiments, the encryption operation may be performed in one storage location (e.g., a first data center) of the virtual storage system 100, and the copying operation may be performed in another storage location (e.g., a second data center) of the virtual storage system 100.

The electronic document is accessible only by the user at the user computing device 50 via the banking system 70 according to one embodiment, or via the virtual storage system 100 directly according to alternative embodiments. The electronic document copy and conversion operations are performed via the processor 124 of the virtual storage system 100.

According to alternative embodiments, if a user does not have access rights, upon providing a user with access rights (e.g., by registration process), all or a selection of electronic documents can be automatically copied from the external system into the virtual storage system 100. For example, upon being granted access rights to the virtual storage system 100, the user may be prompted to copy all or a selection of their electronic documents from the external system (e.g., the banking system 70) into the virtual storage system 100. If so, the electronic documents will be automatically copied to the virtual storage system 100.

The present invention is described herein in terms of block components, screen shots, and optional selections and processing steps. It should be appreciated that the functional blocks may be realized by any number of hardware and/or software components configured to perform the specified functions. For example, the present invention may employ various integrated circuits e.g., memory elements, processing elements, logic elements, look-up tables, and others which may perform the functions under the control of one or more processors or other control devices. The software components can be implemented with any programming or scripting language, with various algorithms implemented with data structures, objects, processes, and other programming elements.

An exemplary process of the method of FIG. 6 will be described with reference to the screen shots shown in FIGS. 9 and 10.

Figure 9:
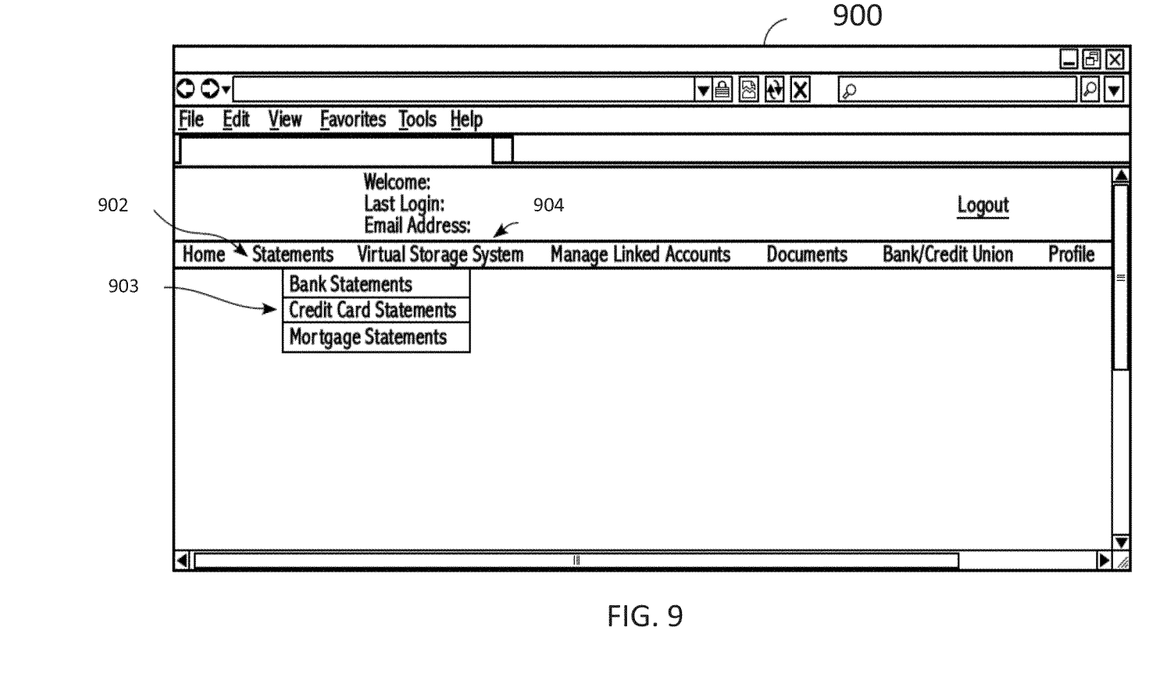
FIG. 9 is a screen shot of the virtual storage system that can be implemented within one or more embodiments of the present invention.

As shown in FIG. 9, the screen shot 900 for a user to access banking information via the user computing device 50. As shown, the user has access to electronic statements at a link 902 via a dropdown window 903 and the virtual storage system 100 via a link 904. The user also has access to various other banking information and links for performing banking transactions (e.g., a managed link accounts link). The screen shot 900 is implemented for example, via a web page for network transmission. The web page may include standard HTML documents, and various forms JAVA® applets, active server pages (ASP), common gateway interface scripts (CGI), extensive markup language (SML), dynamic HTML, plugins, etc.

The user selects and views electronic statements (e.g., regular account statements, credit card billing statements, or loan statements), via the dropdown window 903, for example (operation 612 of FIG. 6).

Figure 10:
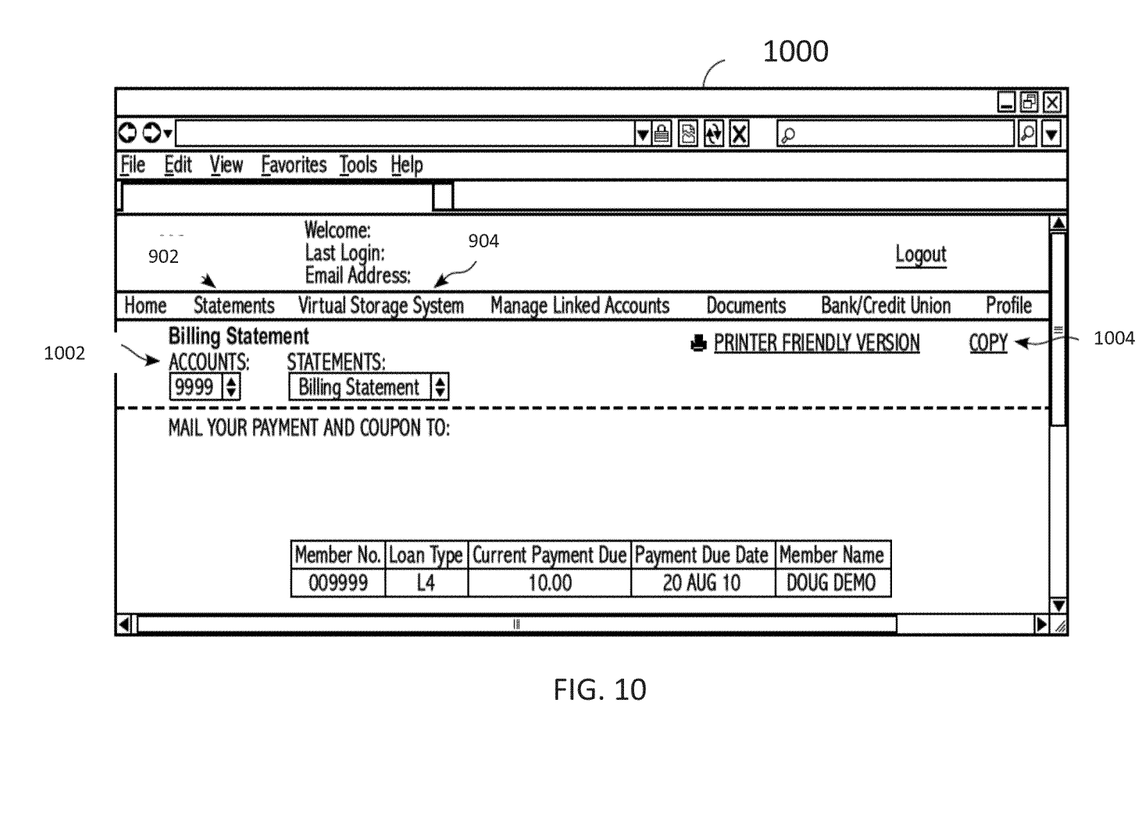
FIG. 10 is a screen shot of an exemplary electronic document that can be implemented within one or more embodiments of the present invention.

FIG. 10 is a screen shot 1000 of an electronic document 1002 (e.g., structured data) as selected by the user.

The electronic document 1002 includes a copy link 1004 for copying the electronic document 1002 as desired by the user. The user selects the copy link 1004 within the electronic document 1002 to copy the electronic document.

In view of the above, the present method embodiment may therefore take the form of a computer or controller implemented processes and apparatuses for practicing those processes. This disclosure can also be embodied in the form of computer program code containing instructions embodied in tangible media, such as floppy diskettes, CD ROMs, hard drives, or any other computer-readable storage medium, wherein, when the computer program code is loaded into and executed by a computer or controller, the computer becomes an apparatus for practicing the invention. This disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above.

Embodiments of the present invention provide a virtual storage system in data communication with a user computing device via a communication network, the virtual storage system comprising at least one processor configured to retrieve data of a first format corresponding to specific electronic data transmitted from an external system and stored within the virtual storage system, convert the data into a second format, retrieve a first style sheet to be associated with the data, convert the data using the first style sheet, retrieve a second style sheet for the data, and display the data at the user computing device using the second style sheet. The virtual storage system further comprises a plurality of redundant physical storage devices in data communication with the at least one processor and each configured to store the data retrieved from the external system, the first style sheet and the second style sheet, and the data to be displayed at the user computing device.

Further, embodiments of the present invention provide a method implemented by computer system to effect the file conversion of data within a virtual storage system, the method comprising connecting the virtual storage system with an external system, retrieving, via the virtual storage system, data of a first format corresponding to specific electronic data transmitted from the external system and stored within the virtual storage system, converting the data into a second format, retrieving a first style sheet associated with the data, converting the data using the first style sheet, retrieving a second style sheet for the data, and displaying the data using the second style sheet.

Further still, embodiments of the present invention provide a method implemented by computer system to effect copying of electronic documents into a virtual storage system in data communication via a communication network, with an external system, the method comprising processing an electronic document associated with a user, at the external system, determining whether the user has access rights to the virtual storage system, converting the electronic document from a first format to a second format, and copying the electronic document to the virtual storage system Further yet still, embodiments of the present invention provide a computer readable medium storing computer executable instructions that, when executed, cause a computing device to perform a method of converting unstructured data to structured data within a virtual storage system, the method comprising connecting the virtual storage system with an external system, retrieving, via the virtual storage system, data of a first format corresponding to specific electronic data transmitted from the external system, converting the data into a second format, retrieving a first style sheet associated with the data, converting the data using the first style sheet, retrieving a second style sheet for the data, and displaying the data using the second style sheet.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A virtual storage system in data communication with a user computing device via a communication network, the virtual storage system comprising:
   at least one processor configured to:

retrieve data of a first format corresponding to specific electronic data transmitted from an external system and stored within the virtual storage system, convert the data into a second format;

retrieve a first style sheet to be associated with the data, convert the data using the first style sheet, retrieve a second style sheet for the data of the second format, and display the data of the second format at the user computing device using the second style sheet; and a plurality of redundant physical storage devices in data communication with the at least one processor and each configured to store data retrieved from the external system, the first style sheet and the second style sheet, and the data to be displayed at the user computing device, wherein the data is periodically transmitted from the external system to the virtual storage system.

2. The virtual storage system of claim 1, wherein the external system is an online banking system.

3. The virtual storage system of claim 2, wherein the data of a first format is user-specific banking account data.

4. The virtual storage system of claim 3, wherein the data of the second format to be displayed at the user computing device is a banking statement.

5. The virtual storage system of claim 4, wherein the second style sheet comprises a cascading style sheet (CSS) language.

6. The virtual storage system of claim 1, wherein the first style sheet comprises an extensible style sheet language (XSL) for performing XSL transformations.

7. The virtual storage system of claim 1, wherein the data of the second format is of an extensible markup language (XML) format and the data to be displayed at the user computing device is of a hyper text markup language (HTML) format.

8. The virtual storage system of claim 1, wherein the data is converted from a first format to a second format prior to being copied to virtual storage system.

9. A method implemented by computer system to effect the file conversion of data within a virtual storage system, the method comprising:

connecting the virtual storage system with an external system;

retrieving, via the virtual storage system, data of a first format corresponding to specific electronic data transmitted from the external system and stored within the virtual storage system;

converting the data into a second format;

retrieving a first style sheet associated with the data;

converting the data using the first style sheet;

retrieving a second style sheet for the data of the second format; and displaying the data of the second format using the second style sheet, wherein retrieving data comprises:

periodically transmitting the data of the first format from the external system to the virtual storage system;

storing the data transmitted within the virtual storage system; and retrieving the data to be processed via the virtual storage system.

10. The method of claim 9, wherein the external system is an online banking system.

11. The method of claim 10, wherein the data of the first format is user-specific banking account data.

12. The method of claim 11, wherein the data of the second format to be displayed at the user computing device is a banking statement.

13. The method of claim 9, wherein the first style sheet comprises an extensible style sheet language (XSL) for performing XSL transformations.

14. The method of claim 9, wherein the second style sheet comprises a cascading style sheet (CSS) language.

15. The method of claim 9, further comprising:

storing the data of the first format retrieved from the external system, the first style sheet and the second style sheet, and the data to be displayed at the user computing device within a plurality of redundant physical storage devices of the virtual storage system.

16. A method implemented by computer system to effect copying of electronic documents into a virtual storage system in data communication via a communication network, with an external system, the method comprising:

processing an electronic document associated with a user, at the external system;

determining whether the user has access rights to the virtual storage system;

converting the electronic document from a first format to a second format periodically transmitting the electronic document of the first format from the external system to the virtual storage system;

storing the electronic document transmitted within the virtual storage system; and retrieving the electronic document to be processed via the virtual storage system.

17. The method of claim 16, wherein converting the electronic document comprises:

retrieving, via the virtual storage system, data of a first format corresponding to the electronic document transmitted from the external system and stored within the virtual storage system;

converting the data into a second format;

retrieving a first style sheet associated with the data;

converting the data using the first style sheet;

retrieving a second style sheet for the data of the second format; and displaying the data of the second format using the second style sheet.

18. A non-transitory computer readable medium storing computer executable instructions that, when executed, cause a computing device to perform a file conversion method within a virtual storage system, the method comprising:

connecting the virtual storage system with an external system;

retrieving, via the virtual storage system, data of a first format corresponding to specific electronic data transmitted from the external system and stored within the virtual storage system;

converting the data into a second format;

retrieving a first style sheet associated with the data;

converting the data using the first style sheet;

retrieving a second style sheet for the data of the second format;

displaying the data of the second format using the second style sheet, and storing the data of the first format retrieved from the external system, the first style sheet and the second style sheet, and the data to be displayed at the user computing device within a plurality of redundant physical storage devices of the virtual storage system.

* * * * *